(12) United States Patent
Lindenau et al.

(10) Patent No.: US 12,348,906 B2
(45) Date of Patent: Jul. 1, 2025

(54) EMERGENCY DISPATCH SYSTEM WITH VIDEO SECURITY CAMERA FEEDS AUGMENTED BY 360-DEGREE STATIC IMAGES

(71) Applicant: Fusus, LLC, Peachtree Corners, GA (US)

(72) Inventors: Christopher R. Lindenau, Peachtree Corners, GA (US); David A. Robinson, Atlanta, GA (US); Jesse H. Smith, Cumming, GA (US); Luis Fernando Diaz Velazquez, Norcross, GA (US); Cody D. Mullin, Atlanta, GA (US)

(73) Assignee: Fusus, LLC, Peachtree Corners, GA (US)

( * ) Notice: Subject to any disclaimer, the term of this patent is extended or adjusted under 35 U.S.C. 154(b) by 102 days.

(21) Appl. No.: 17/990,998

(22) Filed: Nov. 21, 2022

(65) Prior Publication Data

US 2024/0171709 A1    May 23, 2024

(51) Int. Cl.
*H04N 7/18* (2006.01)
*G06F 3/04817* (2022.01)
*H04N 23/698* (2023.01)

(52) U.S. Cl.
CPC ......... *H04N 7/181* (2013.01); *G06F 3/04817* (2013.01); *H04N 23/698* (2023.01)

(58) Field of Classification Search
CPC ... H04N 7/181; H04N 23/698; G06F 3/04817

(Continued)

(56) References Cited

U.S. PATENT DOCUMENTS

| | | | |
|---|---|---|---|
| 8,576,066 B2 | 11/2013 | Bivens et al. | |
| 8,836,802 B2 * | 9/2014 | Laberge | H04N 23/90 348/211.8 |

(Continued)

FOREIGN PATENT DOCUMENTS

| | | |
|---|---|---|
| EP | 0513601 A1 | 11/1992 |
| EP | 3965085 | 3/2022 |

(Continued)

OTHER PUBLICATIONS

USPTO, Non-Final Office Action dated Feb. 14, 2023 in U.S. Appl. No. 17/752,626.

(Continued)

*Primary Examiner* — Tung T Vo
(74) *Attorney, Agent, or Firm* — NK Patent Law

(57) ABSTRACT

An emergency dispatch system configured to allow first responders to efficiently utilize video-based systems using static images of a space and to understand a physical layout of the space. The system includes a dispatch processing hub linked via a communications network with client devices. The system further includes data storage storing a static image of a monitored space from a supplemental camera and video of the monitored space from video sources. A map interface generator is provided that is configured for generating a map-based interface for display upon a display device of the client devices. The map-based interface provides access to the static image and to the video. The hub functions to serve the map-based interface to the client devices. The dispatch processing hub responds to user input selecting the static image by providing a view, e.g., a 360-degree view, of the monitored space based on the static image.

19 Claims, 4 Drawing Sheets

(58) Field of Classification Search
USPC .......................................................... 348/143
See application file for complete search history.

(56) References Cited

U.S. PATENT DOCUMENTS

| | | | |
|---|---|---|---|
| 10,149,110 B2 | 12/2018 | Cao et al. | |
| 10,650,247 B2 | 5/2020 | Lemberger et al. | |
| 11,089,268 B2 | 8/2021 | Golan et al. | |
| 11,095,858 B2 | 8/2021 | Golan et al. | |
| 11,197,145 B2 | 12/2021 | Martin et al. | |
| 11,410,533 B1* | 8/2022 | Srivastava | G08B 25/006 |
| 2002/0006000 A1* | 1/2002 | Kumata | G02B 23/02 359/857 |
| 2003/0012344 A1 | 1/2003 | Agarwal et al. | |
| 2003/0085992 A1* | 5/2003 | Arpa | G06T 15/205 348/E7.086 |
| 2004/0008253 A1* | 1/2004 | Monroe | H04B 7/18506 348/E7.086 |
| 2008/0084473 A1 | 4/2008 | Romanowich | |
| 2008/0313486 A1* | 12/2008 | Parfitt | G05B 19/054 713/600 |
| 2009/0082882 A1* | 3/2009 | Parfitt | G05B 19/054 700/14 |
| 2010/0238286 A1 | 9/2010 | Boghossian | |
| 2011/0058036 A1* | 3/2011 | Metzger | H04N 7/181 348/143 |
| 2011/0111728 A1 | 5/2011 | Ferguson et al. | |
| 2011/0151825 A1 | 6/2011 | Mathis et al. | |
| 2011/0299835 A1* | 12/2011 | Fleming | H04N 21/6377 386/280 |
| 2012/0206607 A1* | 8/2012 | Morioka | H04N 23/90 348/E5.057 |
| 2013/0072145 A1 | 3/2013 | Dantu | |
| 2014/0160235 A1 | 6/2014 | Norland | |
| 2014/0368601 A1 | 12/2014 | deCharms | |
| 2015/0312527 A1 | 10/2015 | Ansiaux et al. | |
| 2016/0381537 A1 | 12/2016 | R et al. | |
| 2017/0026680 A1* | 1/2017 | Sugio | H04N 21/2187 |
| 2018/0173679 A1* | 6/2018 | Ogawara | H04N 23/63 |
| 2018/0192292 A1 | 7/2018 | Coney | |
| 2018/0241943 A1* | 8/2018 | Lee | H04N 23/698 |
| 2020/0346751 A1 | 11/2020 | Horelik | |
| 2021/0223922 A1* | 7/2021 | Liu | G06F 3/04817 |
| 2021/0314757 A1* | 10/2021 | Pellegrini | G06F 3/0482 |
| 2021/0357639 A1* | 11/2021 | Campbell | G06T 3/047 |
| 2022/0007828 A1 | 1/2022 | President | |
| 2022/0076556 A1 | 3/2022 | Lindenau | |
| 2022/0078281 A1 | 3/2022 | Lindenau et al. | |
| 2022/0078333 A1 | 3/2022 | Cui | |
| 2022/0319303 A1* | 10/2022 | Raucher | G08B 25/10 |
| 2023/0064675 A1* | 3/2023 | Higgins | H04N 23/60 |
| 2024/0062395 A1* | 2/2024 | Robinson | H04N 7/181 |
| 2024/0214527 A1* | 6/2024 | Higgins | G06V 20/52 |
| 2024/0265704 A1* | 8/2024 | Zatvornytskyi | G06T 7/70 |

FOREIGN PATENT DOCUMENTS

| | | |
|---|---|---|
| JP | 2002298261 A | 10/2002 |
| KR | 101297294 B1 | 8/2013 |
| KR | 101832274 B1 | 2/2018 |
| WO | 2020009591 A1 | 1/2020 |

OTHER PUBLICATIONS

USPTO, Non-Final Office Action dated May 4, 2022 in U.S. Appl. No. 17/214,542.
USPTO, Non-Final Office Action dated Feb. 14, 2022 in U.S. Appl. No. 17/013,008.
USPTO, Notice of Allowance dated May 5, 2022 in U.S. Appl. No. 17/013,008.
USPTO, Notice of Allowance dated Apr. 3, 2023 in Application No. 17,752,626.
USPTO, Notice of Allowance dated Jul. 28, 2022 in U.S. Appl. No. 17/214,542.
USPTO, Corrected Notice of Allowance dated Aug. 9, 2022 in U.S. Appl. No. 17/214,542.
CIPO, Combined Canadian Office Action and Examination Search Report dated Mar. 29, 2022 in Application No. 3,105,738.
USPTO, Corrected Notice of Allowance dated May 17, 2022 in U.S. Appl. No. 17/013,008.
Extended European Search Report, for Application No. 21194779.1, mailed Jan. 21, 2022.
EPO, Extended European Search Report for corresponding European Patent Application No. 23208745.2, mailed Mar. 22, 2024, 8 pages.

* cited by examiner

EMERGENCY DISPATCH SYSTEM WITH VIDEO SECURITY CAMERA FEEDS AUGMENTED BY 360-DEGREE STATIC IMAGES

BACKGROUND

1. Field of the Description

The present description relates, in general, to emergency dispatch systems and processes, and, more particularly, to an emergency dispatch system, such as a real-time crime center, that is cloud-based and configured to provide unique payloads of data and video to emergency dispatch centers and to emergency responders including police department personnel, firefighters, and the like.

2. Relevant Background

A dispatcher is a communications worker who receives and transmits information to coordinate operations of other personnel and vehicles carrying out a service. A number of organizations, including police and fire departments and emergency medical services, use dispatchers to relay information, direct personnel, and coordinate their operations. An emergency dispatcher, also known as a public safety dispatcher or a 9-1-1 dispatcher, receives calls from individuals who require emergency services including police services, firefighting, and emergency medical services.

Once information is obtained from the caller, the dispatcher activates the appropriate services necessary to respond to the nature of the call for help. The dispatcher also obtains and relays pertinent information to the field units to help ensure the adequacy and safety of the response, and, in the process, the dispatcher is generating a dispatcher incident narrative that may later be reviewed. Emergency dispatchers may also use preapproved protocols to talk a caller or bystander through lifesaving medical procedures such as cardiopulmonary resuscitation, childbirth, and first aid.

Presently, law enforcement and other agencies rely heavily upon the skill and experience of the human dispatcher to quickly analyze each call for assistance and to respond correctly and quickly to dispatch proper personnel and equipment for each incident. The responding personnel (i.e., "responders" or "dispatched personnel") may, in some cases, be provided or call up a map of the location of the incident, but, otherwise, they often are only provided information obtained by the dispatcher who took the call.

In some cases, the responder will also be provided selectable video feeds from video cameras located in the area in which the call is located or in nearby areas. However, the responders view of the space is limited to the available video cameras and there fixed locations, which often will lead to numerous blind spots or areas with no or little security camera coverage As a result of these and other issues, most responders have to approach the incident scene with an often-inadequate amount of information about the incident, which can result in unsafe situations for the responders and for the people involved in the incident.

SUMMARY

The inventors recognized that there are numerous limitations to sole reliance upon existing video-based emergency dispatch (or security) systems for information about a space related to an emergency call. One particular issue is that for many spaces the coverage of existing security or monitoring cameras is limited and fixed in location and area of focus (or coverage area).

For example, many entities will place a set of video cameras (e.g., closed-circuit television cameras (CCTV)) about the perimeter of their property to provide video surveillance, and these cameras often are directed outward to detect potential intruders or breaches along a security fence. There will be few or no internal cameras provided on the property, which results in emergency responders having no visual information regarding the interior spaces. One example would be a large industrial complex that places security cameras along their perimeter fences but few or no interior cameras. In some cases, interior cameras are provided, but there are still many blind spots or spaces with no camera coverage, and this can lead to difficulty for responders arriving upon an emergency scene who have difficulty orienting themselves with the available video cameras. This can be important in responding to emergencies or crimes occurring within the interior spaces or in the "blind spots" of the video surveillance.

More particularly, an emergency dispatch system is described that is configured to allow first responders to more efficiently utilize available video-based systems using supplemental static or still images of a space and also to more quickly understand a physical layout of the space. The system includes a dispatch processing hub communicatively linked via a communications network with a plurality of client devices. The system further includes data storage storing a static image of a monitored space from a supplemental camera and video of the monitored space from video sources. On the dispatch processing hub, a map interface generator is provided that is configured for generating a map-based interface for display upon a display device of each of the plurality of client devices. In preferred embodiments, the map-based interface is configured to provide access to the static image from the supplemental camera and to the video from the video sources. Further, the dispatch processing hub functions during system operations to serve the map-based interface to at least one of the client devices. Significantly, the dispatch processing hub responds to user input selecting the static image or one of the video sources by providing a view of the monitored space based on the static image or to provide access to the video of the monitored space captured by the selected one of the video sources, respectively.

In some embodiments of the emergency dispatch system, the static image is a digital still image of a portion of the monitored space. In such cases, the digital still image may be a 360-degree view of the portion of the monitored space, and the supplemental camera may be or include a 360-degree digital camera. The portion of the monitored space captured by the supplemental camera in the static image may be wholly or partially missing from the video from the video sources (e.g., the portion is a blind spot of the available video cameras). Also, the portion of the monitored space may include a physical location of at least one of the video sources (e.g., the still image captures images of the video cameras or their mounting location in the monitored space), which facilitates responders' selection of video camera feeds for review as part of call response.

The map interface generator is sometimes configured to generate the map-based interface to include selectable icons associated with the supplemental camera and video cameras of the video sources that are located on the map-based on interface based on physical locations of the supplemental camera at the time the static image was captured and on physical location of the video cameras when the video was captured. In such cases, the selectable icons can also be generated by the map interface generator based on orientations of the supplemental camera and the video cameras at the time the static image and the video was captured.

DETAILED DESCRIPTION

Figure 1:
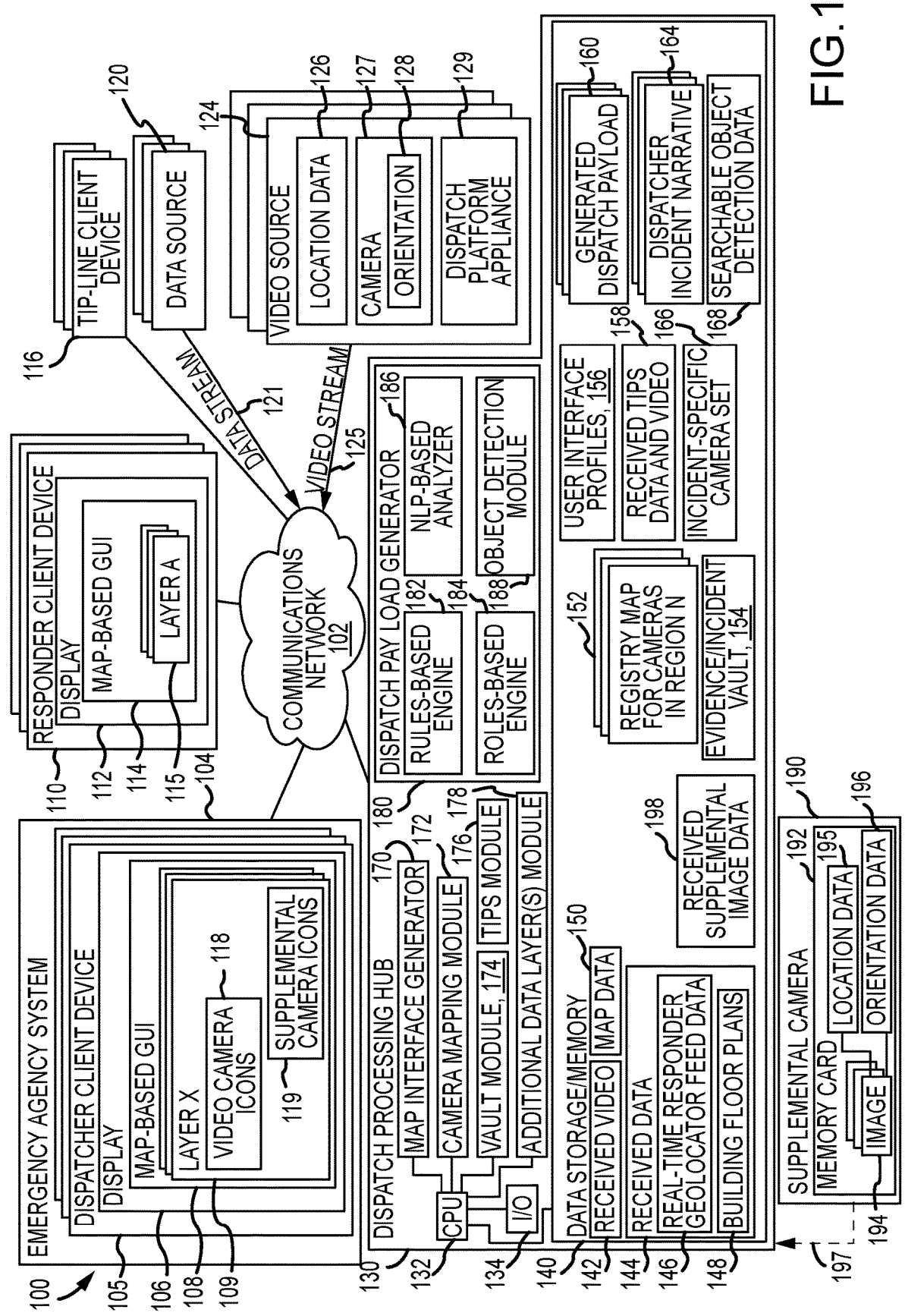
FIG. 1 is a functional block diagram of an emergency dispatch system configured for providing digital media payloads including supplemental static images of spaces along with conventional video streams according to the present description.

In brief, an emergency dispatch system is described that supplements or augments the information provided by existing video camera-based systems. The emergency dispatch system is configured to receive still or static images of spaces near, but typically not covered by, existing video surveillance cameras. In other words, the images are captured by supplemental cameras in spaces that are often considered "blind spots" of a CCTV or similar system and/or can be used to provide locational context for the available cameras and their feeds to responders. To this end, the supplemental cameras may be implemented using 360-degree cameras such that the supplemental images are 360-degree images captured at known locations relative to surveillance cameras. In this way, the 360-degree images can act as a "table of contents" for the nearby surveillance cameras allowing responders to better understand a geographical area associated with a call and to be able to efficiently identify which of the often many surveillance cameras to access for visual information regarding a call's subject.

With this in mind, the emergency dispatch system is configured to receive digital images from one-to-many supplemental cameras that can provide supplemental images at one-to-many locations and to store these images along with supplemental camera data (e.g., GPS coordinates or other location data for where the camera was when the image was captured along with which direction the camera was facing or focused). The system also includes a camera mapping module for mapping the locations and orientations (which way were they focused or pointed) of the surveillance cameras and also the supplemental cameras, at the point in time when they captured the supplemental images. This information is provided to a map interface generator that is configured to generate a graphical user interface (GUI) that presents a map or view showing the locations of the surveillance cameras along with the locations of the supplemental cameras. This may be done with displayed icons, which a responder (or other user) can select to obtain a supplemental image providing a view of the space (e.g., a 360-degree view of the space at the location of the icon representing a supplemental camera's location). The user can close this view of the supplemental image, select another supplemental image to better understand a space, or select one of the surveillance cameras to obtain a present (or past) video stream of a camera identified, in some cases, using spatial or location information provided by the supplemental image view.

In creating the new dispatch system, the inventors recognized that the proliferation of video security or monitoring cameras (e.g., CCTV systems) within a jurisdictional envelope of police oversight has proceeded most typically along travel corridors. These systems use static view camera placements to capture video to monitor egress points of structures that are often associated with the greater security interests. The resulting surveillance coverage, however, has significant blind spots that are not accessible with feeds from existing security cameras.

Additionally, emergency calls are often associated with large properties that may have a single address, which makes it difficult for first responders to know exactly where portions of the property or space associated with a call are located, e.g., a fight is reported on tennis courts of a large country club serviced with perimeter and/or egress security cameras. In such cases, the new emergency dispatch system generates, upon request by a responder or user, static supplemental views (e.g., 360-degree views) of digitally inaccessible locations to enable orientation of enroute first responders to the large property. In some embodiments of the emergency dispatch system, directionally specific streaming camera views are intentionally provided within the 360-degree view provided by a supplemental camera, and, hence, the GUI generated by the system allows a responder to select (e.g., click upon or touch on a touch screen) icons in a map-based GUI that represent video security cameras based on the installed location relative to the location and orientation of the 360-degree view. In the above country club example, a 360-degree view provided by a 360-degree camera positioned within or near the tennis courts may provide a view of one, two, or more security video cameras that may be directed toward the tennis courts or to spaces nearby the tennis courts showing egress points to the tennis courts. In this way, the 360-degree supplemental view acts as a table of contents to the set of available video cameras for a property, structure, or geographical space associated with a call.

The emergency dispatch system may be implemented to serve any number of emergency responders or others monitoring a space. To provide a specific but non-limiting example, some embodiments of the emergency dispatch system described herein are directed toward a cloud-based real-time crime center solution with a digital media enriched dispatch system. The dispatch system was developed to enable law enforcement and public safety agencies to operate more efficiently with improved operational intelligence and with a proactive emphasis on officer (or "responder"), citizen, and community safety. The dispatch system, when used by law enforcement agencies, may be considered a real-time crime center in the cloud platform with video streams augmented by 360-degree images captured by one or more supplemental cameras (e.g., 360-degree static cameras such as the GoPro Max or other 360-degree camera while some embodiments will utilize more conventional 180-degree digital cameras to capture static or still images of a space).

The dispatch system operates to extract and unify live video and data feeds from virtually any source. In this manner, the dispatch system creates or includes a central hub that enhances the situational awareness and investigative capabilities of law enforcement and public safety agencies.

The dispatch system is adapted to bring all personnel and emergency operations centers under a unified umbrella that aggregates video, still images (e.g., 360-degree static images of a space), and data, such as with computer-aided dispatch (CAD) or other mapping systems and software, to facilitate easier tracking of personnel and incidents in a map-based interface. Digital evidence, relating to an incident to which response was provided, may be stored in a secure digital vault (which may be configured to be Criminal Justice Information Services (CJIS) compliant) that can then be made accessible to investigators.

The video sources of the dispatch system may include feeds from a camera on a drone, a traffic camera, a private cellphone or smartphone (or other similar computing and/or communication device), a building security camera, a camera on a bomb disposal or response robot, and the like. The dispatch system can extract the live video feed and send it to an emergency operations center and to responders in the field. The dispatch system combines video and static imagery with other utilities like real-time officer/responder geolocator feeds, a registry map of public and private cameras in a region associated with an incident, a multi-media tips line for the public, and a digital evidence vault for investigators.

FIG. 1 is a functional block diagram of an emergency dispatch system 100 of the present description. The dispatch system 100 is generally made up of a dispatch processing hub 130 that serves combinations of video, supplemental static images, and data (or a dispatch directed payload) via a map-based interface. In particular, the hub 130 is shown to be linked (e.g., for digital communications), via digital communications network 102, to an emergency agency system 104 (one shown but two, three, or more may be included in system 100), a plurality of responder client devices 110, a plurality of tip-line client devices 116, data sources 120, video sources 124, and at least periodically with supplemental cameras 190 (digital static imagery and associated data may be downloaded via a network or via transfer of a physical memory card (or other data storage device) from a camera 190 used during supplemental image capture operations as shown with dashed line 197). The dispatch processing hub 130 is cloud-based (e.g., a Software as a Service (SaaS) platform or the like) that is accessible from any Internet-connected computer device or cell or smartphone.

In this regard, the emergency agency system 104 may include one or more dispatcher client devices 105 that may take the form of nearly any computing device that may communicate directly or indirectly with the hub 130 over the network 102 and may take the form of a desktop or portable computer. The device 105 includes a display (e.g., a touchscreen or monitor screen) 106 that is operable to display or present, to an operator who may be acting as a dispatcher, a map-based graphical user interface (GUI) 108 with one or more data and/or static supplemental image and video layers 109 generated and transmitted by the hub 130 during operations of the system 100. As shown, one or more of the layers 109 of the map-based GUI 108 is configured (by the map interface generator 170) to include one or more icons 118 associated with physical locations of video source cameras (e.g., camera 127) as well as one or more icons 119 associated with physical location of a supplemental camera (e.g., camera 190) when it was used to capture a static image (e.g., a 360-degree image) of a space often including the physical location of the video source camera or nearby to it in one of its blind spots. Users of the GUI 108 may select the icons 118 to view a present or past video stream or icons 119 to view a static image of a space taken in the past using a supplemental camera 190.

Responders/officers may operate responder client device 110 that may be vehicle-mounted or handheld/portable computing or communication devices such as tablets, computer pads, smartphones, and the like adapted for digital, wireless communications over the network 102 with the hub 130. Each responder client device 110 will include a display device 112 operable to display a map-based GUI 114 with one or more layers 115 of video, static images, data, or combinations thereof generated and transmitted by the hub 130, and the GUI 114 will include icons similar to icons 118 and 119 to allow the user to access live or past video streams and supplemental static images of a space (e.g., a space associated with an emergency call). Further, members of the public may operate tip-line client devices 116 to access the hub 130 to provide tips that may include data, video, and/or static supplemental images (which are stored at the hub 130 as shown at 158 and 198 in memory/data storage 140, which may be located on any cloud-based device at or accessible by the hub 130).

The hub 130 may take the form of one-to-many computing and data storage devices that are cloud-based or accessible via the Internet or other communications network 102. For ease of explanation, though, the hub 130 is shown to include a processor 132 that manages input/output (I/O) devices 134 that may be used to facilitate receipt and transmittal of communications over the network 102 to and/or from the system 104, the responder client devices 110, the tip-line client devices 116, the data sources 120, the video sources 124, and the static supplemental image sources 190. The processor 132 further manages storage and retrieval of information to and from data storage/memory 140, which may be any data storage device such as a server accessible directly or over the network 102 by the processor 132. The hub 130 performs numerous functions, and, to this end, the processor 132 executes code or instructions (or software, applications, and the like) to provide the functionality (which is described below) of a map interface generator 170, a camera mapping module 172, a vault module 174, a tips module 176, an additional data layer(s) module 178, and a dispatch payload generator 180, which includes or accesses/uses a rules-based engine 182, a roles-based engine 184, a natural language processing (NLP)-based analyzer 186, and an object detection module 188.

The dispatch processing hub 130 receives a data stream 121 from one-to-many data sources 120, and the hub 130 (such as via operations of the map interface generator 170) acts to process and store the data 144 in memory 140. The data stream 121 may include real-time responder geolocator feed data 146 providing present locations of responders for the agency running system 104 as well as other information that may be useful to respond to an incident such as building floor plans 148 for buildings in a region(s) served by the emergency agency system 104. The received (or retrieved) data 121 from sources 120 may also include graphical and/or image-based data, as shown at 150 in memory 140, for generating maps and/or map-based interfaces 108, 114 by map interface generator 170.

The video sources 124 may take a variety of forms such as drones, traffic cameras, private cell phone video, building security cameras, responder-utilized robots with cameras, and so on. Each source may provide a video stream 125 that may be stored in memory 140 as received video 142. The records associated with the received video 142 may include location data 126 for the source 124, and the video source 124 may include a video camera 127 having a fixed or changeable orientation 128, which may be provided for each camera as part of or separately from the video stream 125. A dispatch platform appliance 129 may be provided at some or all the video sources 124 to facilitate the communication of the video stream 125 to the hub 130. In some cases, the appliance 129 is a hardware device that is small, lightweight, and configured to be a plug-and-play device that connects to the camera 127 (or to a network to which the source 124 is linked and/or accessible) so as to bring the video sources 124 into the system 100 (or into the cloud to which the hub 130 is associated with).

The system 100 is configured to provide user-selectable links (e.g., icons) 118 and 119 in the map-based interface 108 and 114 to the video streams and also to static supplemental images of a space. To this end, the system 100 is shown to include (at least periodically) a supplemental camera 190. The camera 190 may take many forms to practice the system 100 such as a conventional digital camera capable of taking standard 180-degree images. In other cases, though, it is advantageous to capture 360-degree images, and a GoPro Max 360-degree camera may be used for camera 190. The cameral 190 may be positioned in a blind spot of one or more of the video source cameras 127 or positioned in spaces adjacent or nearby to the camera locations 126 to obtain imagery that allows responders to orient themselves to a large space or to better select which of the camera sources 124 to access for video streams of a space. For example, the images from camera 190 may act as a table of contents to the video sources 124 with the camera 127 within the range of the 360 (or 180)-degree image captured by the supplemental camera 190.

As shown, the camera 190 includes memory or data storage 192, which may take the form of a removable memory card. The camera 190 is operable to capture one or more images 194 that are stored in the memory 192, and these may take the form of static or still images in conventional 180-degree form or 360-degree form. The camera 190 is positioned at a desired location during its operations to capture the image 194, such as in a location within a large property such as college campus, a park, an industrial complex, a country club or other recreational environment, and so on that may also be covered at least partially by one or more video cameras 127. Location data 195 is captured and stored for each image 194 in memory 192, and this may include latitude and longitude information (e.g., GPS or similar data). Further, orientation data 196 may be captured and stored in memory 192 for each image 194, and this may include information defining how the camera 190 was physically oriented or directed/focused when the image 194 was captured.

During operations of system 100, an operator of camera 190 will move the camera 190 into desired locations and operate it to capture the supplemental images 194. Then, the images 194 along with location data 195 and orientation data 196 are provided (or communicated) to the dispatch processing hub 130 as shown with dashed line 197. This may involve providing a memory card 192 to the hub 130 for downloading the images 194, data 195, and 196 or communicating this information over the communications network 102. As shown at 198, the received supplemental image data is stored in the memory 140 for processing by the hub. Particularly, the camera mapping module 172 acts to process the location data 195 and orientation data 196 to properly place the images 194 spatially relative to locations 126 of the video cameras 127. The map interface generator 170 is configured to produce the supplemental camera icons/links 119 in the map-based GUI 108 using the location data 195, and a user (e.g., a first responder operating the device 110 or a dispatcher operating the client device 105) may select one of the icons 119 to access the supplemental image 194 stored as part of the received supplemental image data 198.

At this point in the description, it may be useful to provide further detail of some of the major components of system 100 including their functions to provide the map-based GUIs 108 and 114 to dispatcher/agency personnel (operators of devices 105) and to responder/field personnel (operators of devices 110), respectively. The map interface generator 170 provides this primary map interface 108, 114 to the processing hub 130, and the interface 108, 114 is primarily designed to be a real-time situational awareness interface that displays real-time information in a variety of configurations. The interface generator 170 pulls in real-time data, such as video 142, received data 144, and received supplemental image data 198 from a variety of sources 116, 120, 124, and 190 and displays it in a map-based format based on map data 150. Primary users of the interfaces 108, 114 provided by interface generator 170 may be real-time crime center personnel and 9-1-1 operators using the devices 105 and officers, emergency responders, SWAT leaders, event and incidence response coordinators, and the like using the devices 110, who will use the interfaces 108 and 114 to direct unfolding situations.

Views of these interfaces 108, 114 are configurable by the generator 170 based on default or user-modified interface profiles 156, which can be used by users to cause the generator 170 to bring in various video elements 142, data elements 144, and supplemental image data 198 as needed to support their roles in incident response (and which may be provided in user-selectable or default data/video set layers 109, 115, which may be generated by an additional data layer module 178). For example, a 9-1-1 operator will likely use a high-level view via their GUI 108 involving potential incident identification based on the triangulation of weapon discharges detected using previously deployed microphone arrays (e.g., ShotSpotter (or other gunshot detection software/system that detects and conveys the latitude and longitude of gunfire or other weapon fire using acoustic sensors) may be used to trigger the system 100 by a gunfire detection alert to turn on and record live (or pre-buffered) video from all connected cameras within a predefined radius of the detected shot), real-time video of situations, and/or office/responder geolocations 146. In contrast, a SWAT leader may use their GUI 114 on their client device 110 to provide zoomed-in map data 150 and detail-oriented configurations set by their profiles 156 and/or by field interactions such that the interface 114 may include floor plans 148 of buildings in the map-based GUI 114 (e.g., in a geographic region for an incident), real-time video 142, and teams (e.g., of available responders as may be defined by one of the data sources 120 and with locations provided via geolocator data 146 from the same or other data source 120). The user interface profile 156 may be added to by the users building upon, in many cases, a default or preconfigured profile (e.g., one for GUI 108 and one for GUI 114 to suit the planned users of the system 100).

The vault module 174 is included in the system 100 to support effective evidence collection and review by investigators both during the investigation of the incident and after the incident has been resolved. The module 174 generates and stores data collected for and transmitted to system users via interfaces 108 and 114 in an evidence vault 154, which is incident specific and which may be CJIS compliant for digital evidence. The vault 154 provides a data management system that collects all pictures, videos, and data related to an incident, and this collected incident information/evidence may be added to a particular incident (which is assigned a unique identifier) folder. The stored information/evidence may be tagged with the incident number/identifier and may include all metadata associated with each piece of information/evidence. The vault information/evidence may include portions of received tips data and video 158 received by the hub 130 from tip-line client devices 116 that are relevant to the incident and video collected 142 from video sources 124 related to the incident (e.g., via dispatch platform appliances 129, shown or accessed by operators in interfaces 108, 114, and manually from any video/still cameras in registry map 152).

The camera mapping module 172 is a cloud-based public camera mapping software that produces a registry map 152 for cameras in various geographic regions. The module 172 provides a mass-configurable public portal to register security cameras 127 as video sources 124 for the hub 130 and to register supplemental image data 198 from camera(s) 190. The registry map 152 and video and static images received 142, 198 from such cameras 127 and 190 can be fed by the map interface generator 170 into the map-based GUIs 108, 114. Users of the map-based GUIs 108, 114 can, during operation of the system 100, request (such as via selection of a camera icon associated with each camera 127 or supplemental camera 190 provided at their physical location (e.g., determined from location data 126 or camera location when static images 194 were captured as determined from location data 195) in the interface 108, 114), video footage 142 directly from the camera mapping interface 108, 114 and the received (which may only occur in some cases upon request from a user) video 142 and/or static images in data 198 may then be filed by the vault module 174 in the vault 154 for evaluation.

The map interface generator 170 may include one or more subroutines or callable applications to create a common operating picture for first responders (i.e., operators of the responder client devices 110 via map-based GUI 114). For example, these subroutine/applications may operate to provide additional data views to video 142 and data 144 and to provide controls that can be stored within a tab in the GUI 114 (or otherwise be initiated or accessed by an operator of the device 110). Users who have access to this tab or initiation interface (e.g., all or a subgroup of the responders such as differing access for leaders than for other members of a team) are able to view additional real-time data sets in the map-based GUI 114 (such as in a differing data layer 115, which may be generated by the additional data layer module 178). The users may also be allowed to configure (and pre-configure via profiles 156) specific map views provided by the map interface generator 170 to better meet their needs. The layers 115 of the interface 114 may provide users of devices 110 with data including teams, call signs, and direct messaging to other personnel accessing the hub 130. To this end, a companion application (not shown in FIG. 1) may be provided on the responder client device 110 (e.g., a smartphone or the like) that allows for geolocation of officers in the field to be provided in the interface 114 (e.g., via mapping of geolocator data 146 received at/retrieved by the hub 130). The companion app may also support individual and group messaging and data sharing across the client devices 110 (and/or with client devices 105), and the users of the companion app would be provided access to the map-based GUI 114 and associated data and video via their client device 110.

The tips module 176 provides a public safety utility or functionality that operates, such as via text message with or a client-based app or on the tip-line client devices 116, which communicate over network 102 with the hub 130 and the module 176. Members of the public can operate their client devices 116 to submit tips, which are stored as shown at 158 in memory 140 by the tips module 176, to the agency associated with the emergency agency system 104 (e.g., a police department) by either texting messages/text, pictures, and/or videos to a publicized number or via a client-based (e.g., smartphone) app running on their client device 116. The tips may be submitted anonymously or have the respondent's identity attached, depending on how the tips module 176 is set up in the system 100. The client-based app may be configured to give the user of the device 116 access to incident (e.g., crime)-related data published by the particular agency. In some embodiments of the system 100, the received tips information 158 may be triaged by one or more of their personnel in response to receiving a new tip alert from the tips module 176 (such as via an update to the map-based GUI 108 on an agency client device 105 created by operations of the map interface generator 170 processing messages from tips module 176). The tips 158, which may be filtered or not by the triage personnel to identify useful or reliable tip information 158, may then be stored as evidence in the incident folder in the vault 154.

The dispatch platform appliances 129 are connected to video sources 124 (such as individual cameras or networks of such cameras) to create a separate secure live video feed 142 to the hub 130. The live video feed is accessed by operators of the client devices 105, 110 via the GUIs 108, 114 in either a map or grid view (which may be selected by an operator of the client devices 105, 110 or be set for their particular role in the dispatch system 100 such as for a dispatcher or field-based responder). The appliances 129 may be equipped with AI at the edge-type code/software. With AI at the edge-type technology, an inexpensive appliance 129 can be plugged into a camera 127 to instantly turn it into a smart, cloud-connected device capable of analyzing data as close as possible to the source.

For example, in some embodiments of system 100, video data is analyzed and processed at the camera 127 or at the source 124, and, based on this processing, a subset of the video or video-based/related data determined to be salient to an incident is moved (as shown with video stream 125) into the cloud for receipt as video 142 for use at the hub 130. This means that cameras 127 that are commercial and consumer grade (or better) from businesses or the like can readily have AI applied to them quickly and affordably, which will vastly increase the number of available intelligence nodes (or video sources 124) for a real-time crime center or other entity employing the emergency agency system 104 and responder client devices 110. This approach or design for system 100 also significantly reduces costs for data servers, additional bandwidth, and infrastructure usually associated with high-volume video collection and analysis.

To support the map interface generator 170, the hub 130 runs a dispatch payload generator 180 (e.g., to provide data and video for populating and for identifying data and video accessible via the interface 108, 114). The payload generator 180 provides a significant enhancement to law enforcement (and other emergency response) information delivery systems and can be thought of as introducing several firsts to the public safety intelligence ecosystem. In this regard, the payload generator 180 is configured to add video intelligence to traditional 9-1-1 call centers by utilizing a rules-based engine 182. During operations of the system, an incident (or 9-1-1) call for service (e.g., to agency system 104 which is linked via network 102 to hub 130). The rules-based engine 182 then responds by interpolating or determining based on call-related data and/or previously received data in memory 140: (1) the priority of the call; (2) the assignee or first responder for the call (e.g., based on type of call and/or location of available responders); (3) the location of this first responder relative to the location of the call for service (or location of an incident being reported in call); (4) the responder's mode of receipt of data (e.g., the type of client device 110 they use and/or the specification of the display 112 and/or the user interface profile 156 associated with the responder); and (5) based on the responder's role within the agency receiving the call, the type of information useful for the responder in addressing the incident identified by or associated with the call for service. The rules-based engine 182 is adapted to achieve automated interoperability between multiple systems that may already be in use by the agency implementing the system 104 and client devices 110, which until the present invention were disparate and manually controlled by separate users (e.g., dispatch software, surveillance management software, communications hardware, and iOS and Android mobile devices and PC computing devices). This processing is used, in part, to generate the dispatch payload 160.

To further tailor the payload 160 delivered to the client devices 105, 110 (e.g., in or via interfaces 108, 114), the payload generator 180 includes a roles-based engine 184. The roles-based engine 184 is configured to allow responders (operators of devices 110) to receive information related to calls for service or alerts (such as license plate recognition alerts) that are germane to their role within the agency using the system 100. Such roles may be stored in the user interface profiles 156 or otherwise in data storage accessible by the engine 184. The system 100 may further expedite generation of the payload 160 by the generator 180 through AI in video analysis to identify video (e.g., a subset or portion of all) within the received video 142 or that available via video streams 125 from sources 124 (e.g., surveillance and mobile cameras) and IoT information (e.g., information from gunshot, license plate, and other alert and data gathering systems) related to the call for service in addition to jurisdictional and patrol-zone boundaries applicable to responding resources. This identified additional information may be provided in layers 109, 115 by the additional data layer module 178 and interface generator 170 and/or in payload 160 to client devices 105, 110 to aid the responder with video and IoT intelligence to achieve more agile and proportionate responses to the incident/call for service by the responders.

The combination of the map interface generator 170 and the payload generator 180 provide a number of unique features that make the operation of the system 100 different than prior dispatch solutions. The hub 130 with its dispatch payload generator 180 and map interface generator 170 is the first solution to tie together all data and video sources 120, 124 that may be useful and desired by law enforcement, security, or other emergency response agency and deliver them via a cloud-based platform in real-time to both facilities that manage emergency response (e.g., via interface 108 on client devices 105 in emergency agency system 104) and those in the field who are executing the response (e.g., responders operating the client devices 110 to access and interact with the interface 114).

Further, the hub 130 is configured to enable law enforcement and other responder agencies to easily integrate and aggregate previously hard-to-access sources of video and data among sources 120, 124. These data sources 120 and video and still image sources 124, 190 may include helicopter, drone, robot, and fixed camera sources (e.g., cameras 127 of video sources 124 providing video streams 125). The integration of these sources 120, 124, 190 into a single unified dispatch payload 160 accessible within a single interface 108 or 114 is unique to the design of system 100. The solution provided during operations of the system 100 is cloud-based and uses existing video and security infrastructure while also, in some embodiments, bringing non-EDGE-based legacy device data into the cloud for analysis (e.g., to be part of data and video streams 121, 125 accessible by the hub 130). Additionally, the methods of rendering the dispatch payload 160 within a map-based interface 108, 114 by the map interface generator 170 (and/or other components of the hub 130) is unique to the design and implementation of the system 100. This uniqueness includes the manner in which the data and video is unified within a map-based interface 108, 114 for usability and efficiency.

Figure 2:
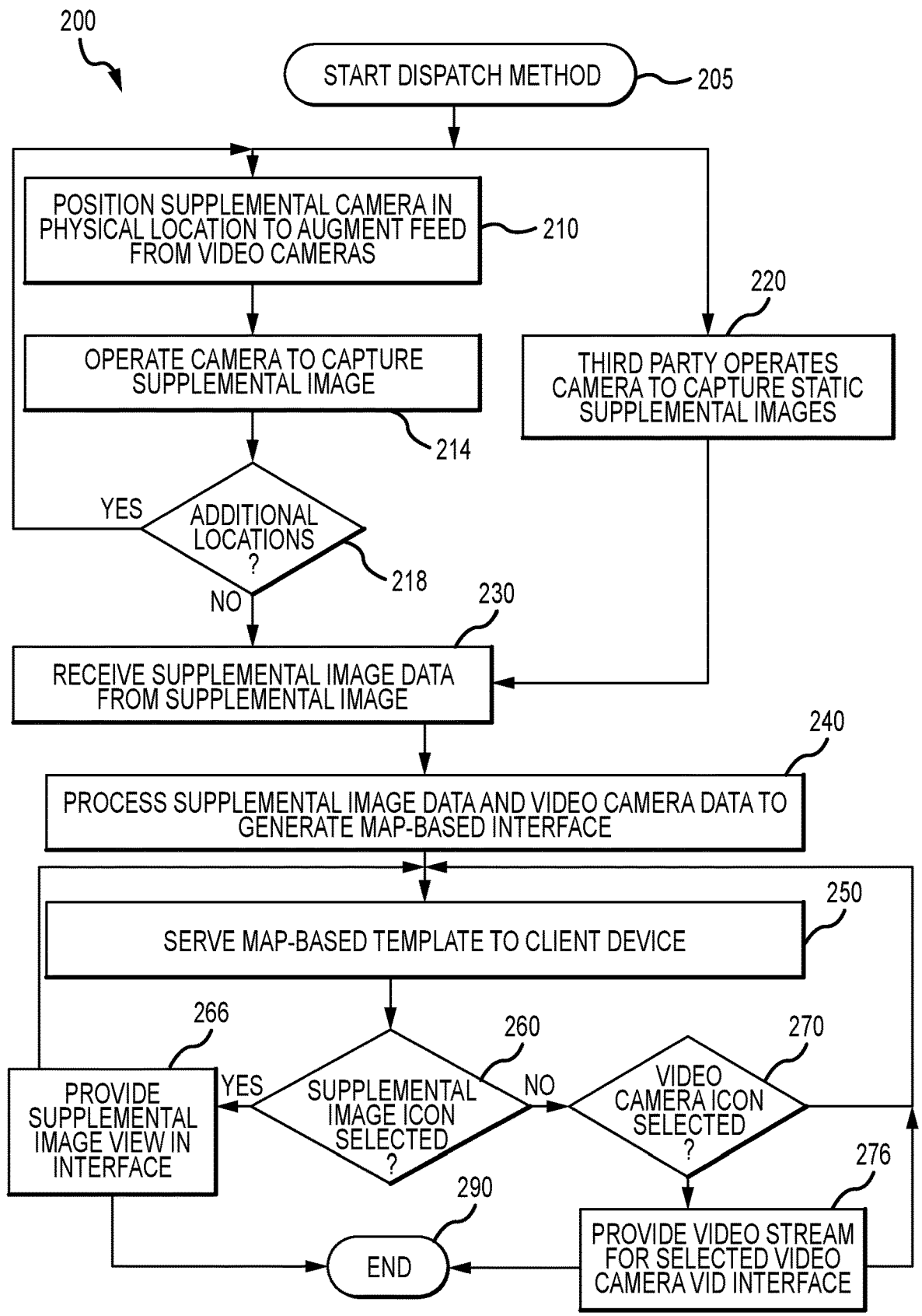
FIG. 2 is an exemplary method of generating and distributing a dispatch payload including supplemental static images via a GUI such as may be implemented during operation of the system of FIG. 1.

FIG. 2 is an exemplary method 200 of generating and distributing a dispatch payload including supplemental static images via a GUI such as may be implemented during operation of the system 100 of FIG. 1. The method 200 starts at 205 such as with providing proper software programs or applications on a dispatch processing hub (such as hub 130 in FIG. 1), and this may include applications useful in processing supplemental image data along with video streams from security cameras (e.g., CCTV) to generate map-based GUIs (as shown at 108 and 114 in FIG. 1 being generated and served in part by functioning of the map interface generator 170 and the camera mapping module 172).

The method 200 continues at 210 with initiating collection of supplemental static images for use with a set of video monitoring or security cameras. This step 210 may include generating a map of a space (e.g., a college campus, an industrial complex, a sporting event venue, a residential community, or other relatively large space) with indicators of the location and coverage of video security cameras. With this information, areas with little or no video coverage or "blind spots" can be identified as part of step 210. Then, a supplemental camera (e.g., a 180-degree or 360-degree digital camera) can be positioned within a first one of these blind spots or other area in which it is desired to augment images captured by the set of security cameras used to monitor a particular space or area. At 214, the supplemental camera is operated to capture a supplemental image (e.g., a 180-degree digital still image or a 360-degree digital still image) from the selected location. The camera preferably is configured to operate at 214 to also capture location and camera direction or orientation data that it associated in its memory/data storage with the capture supplemental image. At 218, a query is performed to determine if there are additional locations for this particular monitored space for which it is desirable to capture supplemental images. If yes, the steps 210 and 214 are repeated. If not, the method 200 continues with step 230.

Concurrently with or at earlier or later times than steps 210-218, the method 200 includes step 220. Step 220 involves third party operators using a digital camera (e.g., a supplemental camera such as a 360-degree camera) to capture supplemental images at locations that they have chosen for their usefulness in augmenting feeds from existing (or later installed) video cameras. For example, an operator of the system 100 of FIG. 1 may provide a 360-degree camera to a police officer, a fire fighter, or other employee of a first responder organization. This camera or one of the organization's or responder's own cameras may be operated in step 220 to capture additional supplemental images (along with camera location and orientation data for each image). In this manner, first responders with a knowledge of a space and limitations of existing video cameras and their feeds can move about the space capturing one-to-many supplemental images that can be used to provide first responders with spatial information to help them orient themselves upon receiving a call and/or as additional information for selecting which video camera to use to access a live or past video stream for information useful in responding to a call.

The method 200 continues at 230 with receiving the supplemental image data (e.g., a digital image and location and orientation information associated with that image) captured in steps 210-220. The image data may be communicated to a dispatch processing hub over a communication network or by providing a memory card from the camera to an operator of the hub for processing. In step 240, the method 200 continues with processing the supplemental image data along with the video camera data to generate a map-based interface. This involves mapping locations of the cameras when the static/still and video images were captured to a physical space and then providing icons/indicators on a map or space-representing image of a space at the mapped physical locations.

Then, at 250, the method 200 continues with serving, such as with a dispatch processing hub, the map-based interface to one or more client devices, and this interface or GUI includes icons/indicators of the location of supplemental static images of the space represented by the interface concurrently with icons/indicators of the location of cameras capturing video security streams. At 260, the method 200 continues with monitoring user interaction with the served interface for selection of one of the supplemental image icons. If none, the method 200 continues at 270. If an icon is selected by a user as determined at 260, the method 200 continues at 266 with providing the supplemental image associated with the selected icon to the user on their client device, e.g., within the interface or in a separate view or window. For example, a user may be provided a 360-degree view of the space within a blind spot of the video cameras represented by icons in map-based interface, and this view (supplemental image) can be used by the operator to orient themselves in the space in a way that would be difficult relying solely upon the video feeds and/or to select a video feed the is likely to provide video of a space related to a call more efficiently (e.g., rather than selecting and viewing all video feeds of space). The method 200 may then end at 290 or continue with repeating step 250.

In step 270, the method 200 includes monitoring the served interface to determine whether a user has selected one of the video feed or camera icons in the interface (e.g., by tapping a touchscreen, by clicking a mouse, and so on). If not, the method 200 continues at 250 (and steps 260 and 270 with continued monitoring for user input). If user input is received indicating selection of one of the video feed icons, the method 200 continues at 276 with serving or providing a video stream associated with the selected icon to the user via the interface (e.g., in a window within the interface, in a separate view, or the like). The method 200 may then continue at 250 when the user is finished viewing the video feed or may end at 290.

Figure 3:
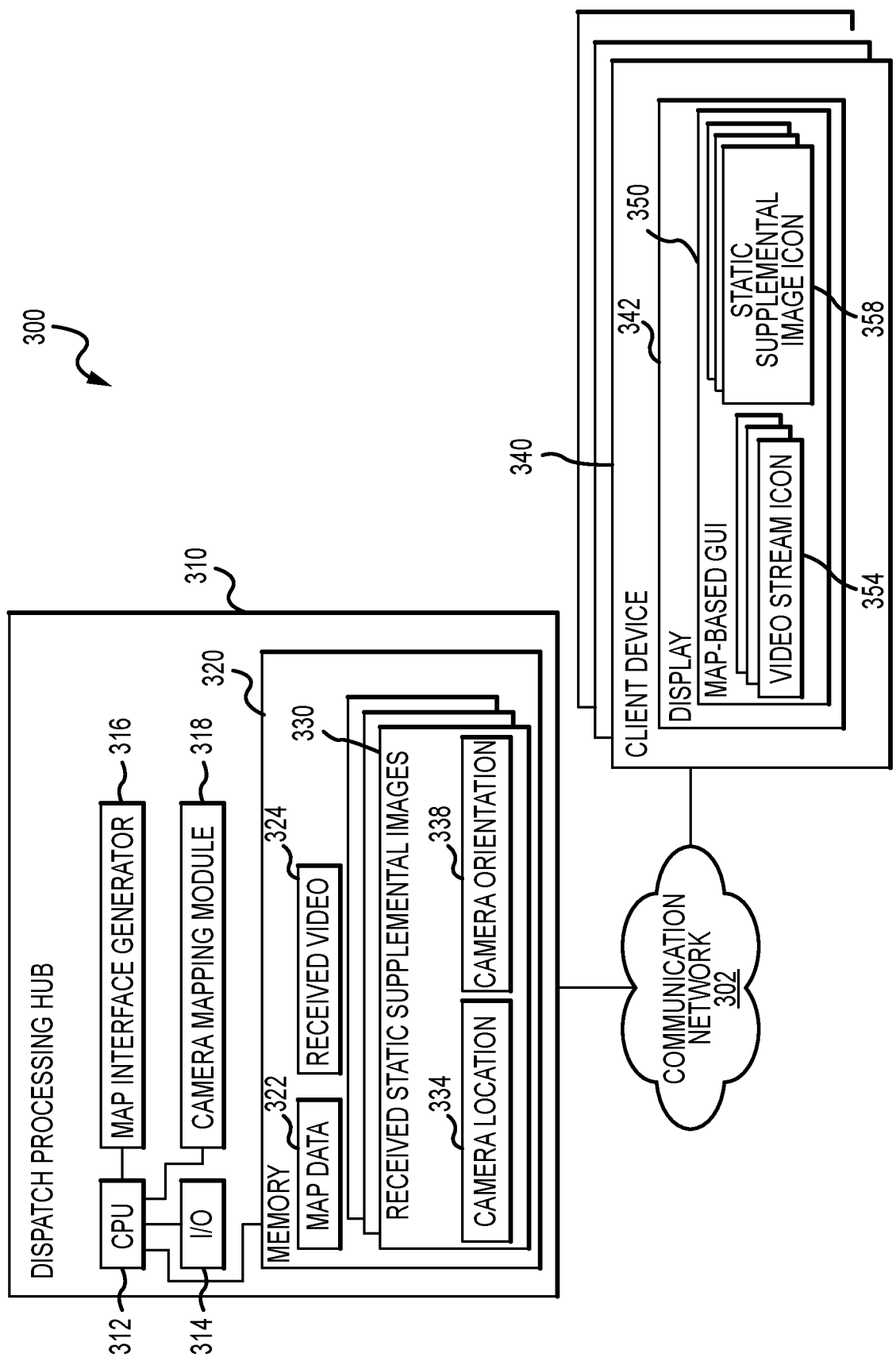
FIG. 3 is a functional block diagram of another embodiment of a dispatch system of the present description.

FIG. 3 illustrates another dispatch system 300 that may be used to implement the techniques described herein, and the system 300 may be considered a simplified version of the system 100 of FIG. 1 useful for providing responders or other users with static images of a space to augment available video streams of the space. As shown, the system 300 includes a dispatch processing hub 310 communicatively linked in a wireless or wired manner via network 302 to one-to-many client devices 340. The client devices 340 may be nearly any computing or communication device configured to be able to operate a display screen/device 342 to display a received interface (i.e., a map-based GUI 350) and to also receive user input via the display 342 (or otherwise) to allow a user/operator to select one or more icons 354, 358 and, in response, to display video or still images.

The hub 310 includes a processor 312 that manages operations of input/output (I/O) devices that, for example, are used to communicate with the client device 340 over network, to receive static supplemental image data, and to receive video streams from live video cameras (not shown but understood from FIG. 1). The processor 312 executes code or instructions to provide the functions of a map-based interface generator 316 and a camera mapping module 318, both of which were described in detail with reference to FIG. 1. The processor 312 also manages data storage in and retrieval from a memory or data storage device 320, and this includes storing map data 322 for a space, video 324 received from one or more video cameras positioned to focus on or near areas of the space defined in part by the map data 322, and supplemental images 330. The supplemental images or image data 330 include a camera location 334 and a camera orientation 338, which are useful for mapping or positioning icons/links to the images relative to the map data 322 for the space being monitored.

During operations, the mapping module 318 acts to use location (and/or orientation) data for video cameras providing the video 324 and the location 334 and orientation data 338 associated with a supplemental camera used to capture each of the static supplemental images 330 to map the locations from which the videos and still images relative to the map data 322 for the space. The interface generator 316 uses the output of the mapping module 318 along with the map data 322 to generate a map-based interface that may include a visual map of the space. Further, the interface will include icons showing the location of cameras used to capture the receive video 324 and to capture the static supplemental images 330.

Further, during operation of system 300, the hub 310 functions to serve the generated map-based interface to the client device 340. As shown, the GUI includes video stream icons 354 and also static supplemental image icons 358 overlayed upon a map view of the space. The icons 354 can be selected by a user of the client device 340 to access the received video 324 associated with the selected icon 354. Likewise, the icons 358 can be selected by a user via user input to the device 340 to access the supplemental image (e.g., 360-degree static image) 330 associated with the selected icon 358. Stated differently, the hub 310 responds to user input selecting an icon 354 or 358 by serving a video 324 or an image 330 to the device 340 (such as via the interface 350).

Figure 4:
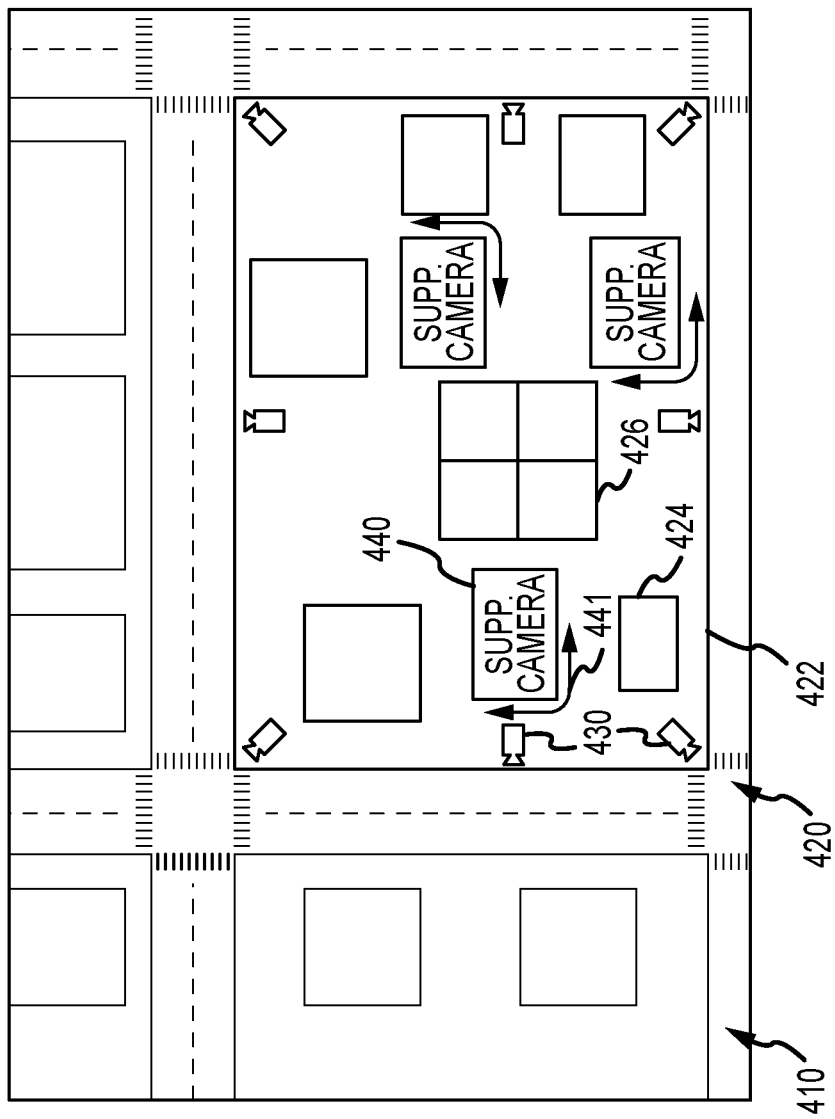
FIG. 4 illustrates an exemplary map (or image)-based user interface generated and presented to client devices during operations of the system of FIG. 1 or the system of FIG. 3.

FIG. 4 illustrates an exemplary map (or image)-based user interface generated and presented to client devices during operations of the system 100 of FIG. 1 or the system of FIG. 3. A screenshot 400 of the user interface as it may appear on a display screen of a client device shown in FIG. 4, and the interface include a map 410 that includes a monitored space 420, which may be a location of an incident that is the subject of an emergency call. The monitored space 420 is defined in part by a perimeter fence 422 through which visitors must pass (e.g., the fence 422 provides points of egress to the space 420). The space 420 includes a number of buildings 424 as well as recreational spaces as shown at 426 with a set of basketball, tennis, or similar courts.

The screenshot 400 shows that the map-based interface is generated to include a plurality of video stream (or camera) icons 430. The icons 430 are provided in the background map 410 at locations corresponding with the physical locations of video cameras operating to capture video of or nearby the space 420. As shown in this example, the icons 430 are placed in locations that indicate that the available video streams are being captured at or near the perimeter fence 422, and many or all the cameras are directed outward to capture people entering or leaving the space 420. This results in large blind spots for the monitored space 420 and can make it difficult for a responder to a call, such as for a fight occurring on the courts 426, to orient themselves in space 420 and/or to select one or more of the security cameras 430 for a video feed of the space 420 that may be related to the call.

To address these issues, the map-based interface shown in screenshot 400 is shown to include a plurality of supplemental camera icons 440. These icons 440 are positioned or mapped to the background map 410 at the locations supplemental images were captured with a camera. In this example, the static supplemental images are 360-degree images as indicated with arrow 441, with the camera being a 360-degree capable digital camera. Hence, a user can provide user input to select one of the supplemental camera (or image) icons 440, and, in response, the user will be linked to or served (e.g., via an update to the interface shown in screenshot 400) a 360-degree image of the space 420 taken at the location associated with the icon 440. Use of the 360-degree supplemental image may assist the responder or user to better understand the layout of the space and/or to select an icon 430 associated with a desirably located video camera (e.g., one showing egress points through fence 422 near the courts 426).

In some preferred embodiments, when a user clicks one of the 360 spheres on the map, the 360 immersive view loads. Within the 360 immersive view displayed in their GUI, there are icons "hanging" in the air that indicate that there is a video camera in that direction for user selection. Then, when those icons are clicked by the user within the 360 view, the system and its software is configured to load the current live view from that camera into the user's GUI/current displayed view. There can be multiple camera icons shown within any 360 view. In some implementations, the system and its software are also configured for also modifying the size of the camera icon within the 360 immersive view such as based on its proximity to the map location of the 360 view.

We claim:

1. An emergency dispatch system, comprising:
a dispatch processing hub communicatively linked via a communications network with a client device;
data storage storing:
a static image of a 360-degree view of a monitored space captured by a supplemental camera; and
video of the monitored space from video sources;
wherein the monitored space includes a physical location of at least one of the video sources,
on the dispatch processing hub, a map interface generator generating a map-based interface for display upon a display device of the client device,
wherein the map interface generator is configured to generate the map-based interface to include a first selectable icon associated with the supplemental camera based on a geographic location of the supplemental camera when the static image was captured,
wherein the dispatch processing hub responds to user input selecting the first selectable icon by providing a 360-degree view interface of the monitored space based on the static image; and
on the dispatch processing hub, a 360-degree view interface generator generating the 360-degree view interface for display upon the display device of the client device,
wherein the 360-degree view interface generator is configured to generate the 360-degree view interface based on the static image of the 360-degree view of the monitored space captured by the supplemental camera,
wherein the 360-degree view interface generator is configured to generate the 360-degree view interface to include second selectable icons associated with the video sources based on the geographic location and an orientation of the supplemental camera when the static image was captured and based on a physical location of the video sources in the monitored space,
wherein the dispatch processing hub responds to user input selecting one of the second selectable icons by providing access to the video captured by the one of the video sources.

2. The emergency dispatch system of claim 1, wherein the supplemental camera is a 360-degree digital camera configured to capture the static image of the 360-degree view.

3. The emergency dispatch system of claim 1, wherein the monitored space captured by the supplemental camera in the static image is wholly or partially missing from the video from the video sources.

4. An emergency dispatch method, comprising:
communicatively linking a processing hub and a video source positioned to capture video of a monitored space;
generating a map-based interface including a map view for display upon a display device of a client device;
receiving a static image captured by a supplemental camera, wherein the static image provides a 360-degree view of the monitored space;
updating the map-based interface to include a first selectable icon representing a geographic location of the supplemental camera when the static image of the monitored space was captured by the supplemental camera;
serving the map-based interface to the client device;
receiving user input from the client device selecting the first selectable icon and, in response, providing access to the static image corresponding to the selected first selectable icon;
generating a 360-degree view interface based on the static image for display upon the display device of the client device,
wherein the 360-degree view interface includes the 360-degree view of the monitored space,
wherein the 360-degree view interface includes a second selectable icon representing a physical location of the video source in the monitored space;
serving the 360-degree view interface to the client device; and
receiving user input from the client device selecting the second selectable icon and, in response, providing access to the video from the video source.

5. The method of claim 4, wherein the geographic location of the supplemental camera is defined by latitude and longitude coordinates associated with the supplemental camera at the time the static image was captured.

6. The method of claim 5, wherein the first selectable icon for the supplemental camera is generated at least in part based on orientation data for the supplemental camera associated with the static image.

7. The method of claim 4, wherein the monitored space includes at least one blind spot for the video source.

8. The method of claim 7, further comprising, prior to the receiving the static image, defining the at least one blind spot and positioning the supplemental camera at the geographic location within the at least one blind spot.

9. A system, comprising:
a dispatch processing hub communicatively linked via a communications network with a client device and a video source; and
data storage storing:
a static image of a 360-degree view of a monitored space captured by a supplemental camera; and
video of the monitored space from video sources;
wherein:
the monitored space includes a physical location of at least one of the video sources,
a map interface generator of the dispatch processing hub generates a map-based interface, the map-based interface including a first selectable icon associated with the supplemental camera;
a 360-degree view interface generator of the dispatch processing hub generates a 360-degree view interface in response to user input selecting the first selectable icon associated with the supplemental camera, the 360-degree view interface being generated from the static image of the 360-degree view of the monitored space captured by the supplemental camera, and the 360-degree view interface including a second set of selectable icons associated with a set of the video sources; and
the dispatch processing hub provides access to the 360-degree view interface generated by the 360-degree view interface generator in response to the user input selecting the first selectable icon,
the dispatch processing hub provides access to the video of the monitored space from the video source in response to a user input selecting one of the second set of selectable icons.

10. The system of claim 9, wherein the video sources include an active camera and one or more additional cameras associated with the monitored space.

11. The system of claim 10, wherein the active camera is determined based at least on an initial user input received from the client device.

12. The system of claim 9, wherein the set of the video sources is determined from the video sources based at least on the monitored space and one or more proximity characteristics associated with each video source of the video sources.

13. The system of claim 12, wherein the one or more proximity characteristics comprise at least one of:
a video source location;
a first distance between the video source location and the monitored space;
a second distance between the video source location and an active camera;
a video source disposition; or
a video source orientation.

14. The system of claim 9, wherein the set of video sources is determined based at least on a spatial ring associated with the monitored space.

15. The system of claim 9, wherein the second set of selectable icons are disposed within the 360-degree view interface based at least on a set of video source positions associated with the set of video sources and a view window of the 360-degree view interface.

16. The system of claim 9, wherein an additional user input associated with a selectable icon from the second set of selectable icons causes an additional video source to become a new active camera.

17. The system of claim 16, wherein the additional user input causes the 360-degree view interface generator to generate an additional 360-degree view interface associated with the new active camera from an additional static image captured by the new active camera and stored by the data storage.

18. The system of claim 17, wherein the additional 360-degree view interface comprises a third set of selectable icons associated with a second set of the video sources.

19. The system of claim 9, wherein the map-based interface includes a route of travel associated with one or more tracked objects.

* * * * *